May 31, 1949.  R. N. PALMER  2,471,698
BUTTON-MAKING TUBULAR-SAW HOLDER AND EXPELLER
Filed Aug. 14, 1944
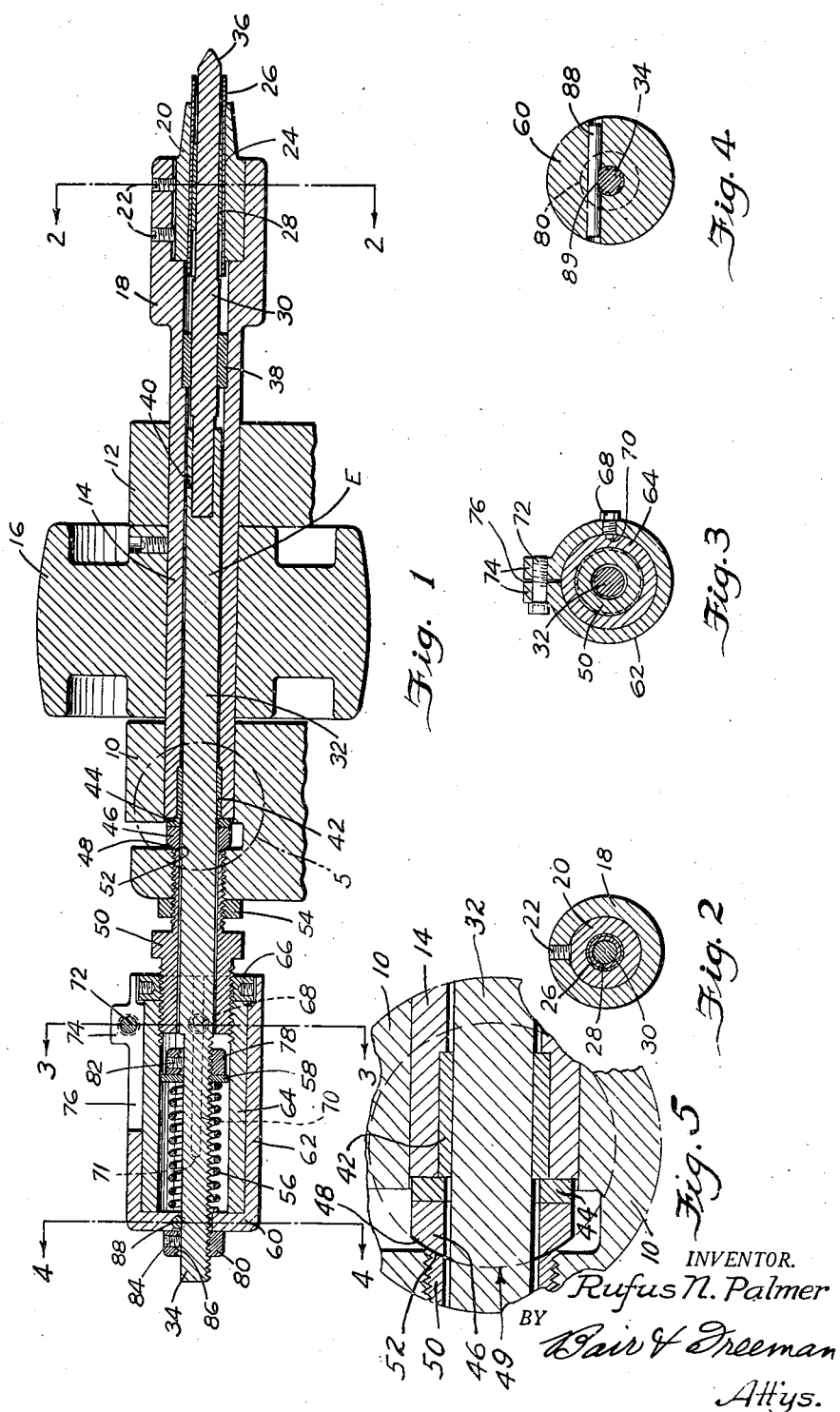
INVENTOR.
Rufus N. Palmer
BY
Bair & Freeman
Attys.

Patented May 31, 1949

2,471,698

UNITED STATES PATENT OFFICE 2,471,698

BUTTON-MAKING TUBULAR-SAW HOLDER AND EXPELLER

Rufus N. Palmer, Pittsburgh, Pa., assignor to American Pearl Button Co., Washington, Iowa, a corporation of Iowa Application August 14, 1944, Serial No. 549,387

17 Claims. (Cl. 79—16)

My present invention relates to a button cutting machine of the horizontal axis type and particularly to constructional features thereof making the machine adaptable for using a saw made of high speed steel.

One object of the invention is to adapt a machine of the horizontal axis, blank expelling type to the use of a high speed steel saw, which necessitates a bushing within the saw to support it, thus making it impossible to permit the button blank to be expelled through the saw itself as in the former type of machine.

Another object is to provide means for expelling the button from the cutting end of the saw in the form of an expeller rod, which rod also effects holding of the button blank during the cutting operation.

A further object is to provide a thrust bearing for the saw spindle which prevents undesirable vibration and yet permits passage of the expeller rod through the spindle, the spindle for this purpose being tubular in character.

Still a further object is to provide means for adjusting the thrust bearing for wear and for adjusting a compression spring that operates the blank expeller rod as well as the position of the expeller rod in relation to the saw before the position of the expeller rod in relation to the saw before the button cutting operation commences.

An additional object is to provide a blank expeller rod of movable nature so that it can be positioned to not interfere with replacing the saw and at the same time eliminate the necessity of backing off the tail stock of the machine while making a saw change.

With these and other objects in view, my invention consists in the construction, arrangement and combination of the various parts of my device whereby the objects contemplated are attained, as hereinafter more fully set forth, pointed out in my claims and illustrated in the accompanying drawings, wherein:

Figure 1 is an elongated sectional view through a button cutting machine embodying my invention.

Figures 2, 3, and 4 are sectional views on the lines 2—2, 3—3, and 4—4 respectively of Figure 1;

Figure 5 is an enlarged sectional view of the portion of Figure 1 shown within the dot and dash line circle indicated as 5.

On the accompanying drawings I have used the reference numerals 10 and 12 to indicate a pair of bearings of a button cutting machine of the horizontal axis, blank expeller type which are known as "button cutting lathes." A tubular spindle 14 is journaled in the bearings 10 and 12 and has a pulley 16 secured thereto for driving the spindle from any suitable source of power.

The spindle 14 has a head 18 at one end thereof in which a saw sleeve 20 is secured as by a pair of set screws 22. The saw sleeve has a tapered bore 24 adapted to receive a tapered, split tubular saw 26. The saw 26 is held rigidly in position by a saw bushing 28 of sleeve-like character having a tapered outer surface and a non-tapered bore.

Heretofore, button cutting lathes of the horizontal spindle type have been provided with tubular saws consisting of a split tubular saw having a wedge driven into the split. These saws cannot operate at high speed because at high speed they are not rigid enough to withstand the vibrations caused by the saw as the teeth thereof successively engage the button blank as it is being cut. They have the advantage however of permitting the buttons to pass on through the hollow spindle and be discharged therefrom.

My saw 26 on the other hand can be made of high speed steel and rotated rapidly, thus cutting down the time necessary to cut a button blank. The saw bushing 28 supports the saw internally while the saw sleeve 20 supports it externally and the saw is thus rigidly held against vibration. Furthermore there is no wedge in the split of the saw so that the saw bushing 28 can effect a close fit of the saw in the saw sleeve and this reduces vibration and eliminates any possibility of the saw running "out of true." My arrangement therefore permits of operation at high speed and thereby reduces cutting time.

Since the saw bushing 28 is smaller in internal diameter than the internal diameter of the cutting saw 26, some means other than passage on through the saw must be provided for expelling the button blank. For this purpose I provide an expeller rod "E" having an end portion 30, a second portion 32 and a reduced third portion 34. The portion 30 is pointed as indicated at 36 and may be made of extremely hard material such as Carboloy or at least tipped with Carboloy as in my copending application Serial No. 542,408, filed June 27, 1944, now abandoned, so as to increase its wear resisting property with respect to the button blank during operation of the saw.

The rod 30 is a loose fit in the saw bushing 28 and is mainly supported and journaled in bearing sleeves 38 and 42 of the spindle 14. The rod 30 has one end secured to the rod 32 by a set screw 40.

In button cutting lathes it has been found desirable to provide a thrust bearing against a fiber thrust washer at the center of the rear end of the spindle, without which vibration during operation is experienced. As my spindle is hollow throughout its length there is no rear end in connection with which such a thrust bearing can be provided. Instead I have found that a fiber washer 44 combined with a bearing for thrust engagement will accomplish the same purpose. I accordingly provide a metal thrust washer 46 having a convex surface 48 which is a section of a sphere indicated by the circle 49 in Figure 5. A thrust sleeve 50 is provided with a concave seat 52 to interfit with the surface 48 and the two surfaces 48 and 52 constitute a "ball and shallow-socket" connection.

The sleeve 50 is threaded in the bearing 10 so as to take up any end play that develops and causes the right end surface of the pulley 16 to remain in working engagement with the left end surface of the bearing 12. A lock nut 54 retains the adjustment.

For biasing the expeller rod E to the position shown in Figure 1, I provide a spring 56 having one end seated against a washer 58 backed by a nut 78, and the other end seated against a wall 60 of a cap 62. The cap 62 is slidable and non-rotatable on a sleeve 64 which in turn is threaded on the thrust sleeve 50 and is thereby adjustable relative to the thrust sleeve. The adjustment may be retained by a lock nut 66.

The cap 62 is slidable and non-rotatable by reason of a cap screw 68 threaded in the cap and loosely entering a slot 70 of the sleeve. The cap is locked in position on the sleeve by means of a clamp screw 72 extending through a pair of ears 74 of the cap, the cap being split as by a slot 76 between the ears. A stop nut 80 is provided on the rod E outside the wall 60 of the cap 62. The nut 80 serves as a means to retract the expeller rod E when the cap 62 is partially backed off the sleeve 64, the movement of the cap being limited by a closed end 71 of the slot 70 (dotted in Figure 1). The nuts 78 and 80 are retained in any adjusted position by set screws 82 and 84 respectively and constitute shoulders on the expeller rod. The set screws 82 and 84 engage a flat side 86 of the rod portion 34 and a key 88 has a notch 89 which also engages this portion. The key is carried by the wall 60 and prevents rotation of the expeller rod E with the spindle 14 when it rotates.

*Practical operation*

In the operation of my button cutting machine, assuming the parts to be in the position of Figure 1, a shell is placed against a supporting plug in the tail stock of the lathe and fed toward the saw 26. The shell will first engage the pointed portion 36 of the expeller rod E and then the spring 56 compresses as the expeller rod is moved toward the left, thereby utilizing the compression of the spring to clamp the blank that will be cut from the shell between the point of the expeller rod and the supporting plug. Thus the blank is held before and during the sawing operation and also after the sawing operation as the tail stock recedes. During such recession, the expeller rod pushes the blank out of the saw in the same manner as disclosed in my above mentioned copending application and drops it only after the stop nut 80 engages the wall 60 and the shell recedes further.

The position of the cap 62 in relation to the thrust sleeve 50 and/or the position of the nut 78 determine the initial position of the spring 56 and the pressure it exerts when the blank first contacts the expeller rod. The position of the stop nut 80 then determines the distance that the portion 36 is normally projected from the saw.

After button blanks have been cut in sufficient number to develop wear in the bearings, such wear may be taken up by adjusting the sleeve 50 as required. The ball and shallow socket connection at 48—52 gives the same centering and non-vibrational effect as in the former type of machine yet permits the use of the expeller rod E.

The saw sleeve 20 may be readily changed and a different size saw and a corresponding expeller rod 30 substituted for the one shown. The change in the expeller rod is readily accomplished by unscrewing the sleeve 64 from the sleeve 50 which brings the entire expeller rod assembly with it.

My arrangement adapts a button cutting lathe for use of a high speed steel saw which cuts down the time required for sawing out button blanks as high speed steel saws will stay sharp 20 to 30 minutes as compared to the carbon steel type capable of staying sharp only five or ten minutes. Time is also saved as the high speed steel saw can be resharpened in a special sharpening machine and in a minimum of time by one machinist attending a considerable number of lathes. This causes few stops to change saws and increases the number of operators that one machinist can sharpen for. Distinguished from my saw, the carbon steel saw having a wedge in its split required hand filing to resharpen it because it had to be resharpened in the lathe. When removed from the lathe and resharpened, one could never be sure it would run true when replaced. Accordingly each lathe operator had to be skilled. With my invention, unskilled operators can be used to operate the lathes and a skilled machinist is needed only for resharpening the saws and is able to do so for many lathe operators.

The design of the lathe is such that the saw sleeve 20 may be removed when the saw is dull (about every 20 minutes) and a sharp saw is inserted and used. The dull saw is left in sleeve 20 and carried to the machinist who can sharpen the saw several times without removing the saw from the sleeve. Each machine has six sleeves and six saws in process of being used and sharpened. The expeller is pulled back by loosening the clamp screws 72 and pulling the cap 62 back to the limit 71 of slot 70 every time a dull saw is removed.

The cap 62 and expeller rod E are removed by unscrewing sleeve 64 from sleeve 50 to change size of saws only infrequently, usually not oftener than once a month and a corresponding size of expeller rod can be substituted. These various operations are possible without prohibitive spacing between the head and tail stocks and without excessive overhang of the tail stock as if it were necessary to back it off far enough to change saws with the expeller rod staying in its extended position.

Some changes may be made in the construction and arrangement of the parts of my device without departing from the real spirit and purpose of my invention, and it is my intention to cover by my claims any modified forms of structure or use of mechanical equivalents which may be reasonably included within scope without sacrificing any of the advantages thereof.

I claim as my invention:

1. In a button cutting machine, a pair of bearings, a tubular spindle through said bearings, a tubular saw carried by one end of said spindle, a thrust element for the other end of said spindle, a threaded sleeve element carried by one of said bearings and engaging said thrust element, one of said elements having a concave seat and the other a convex shoulder interfitting with said seat, a blank expeller rod through said spindle and sleeve element, and a spring biasing said expeller rod toward the cutting end of said spindle.

2. A button cutting machine comprising bearing means, a spindle journaled therein, said spindle being tubular, a tubular saw carried in one end of the spindle, a sleeve within said saw to support it, a blank expeller rod through said sleeve and spindle, a threaded sleeve carried by said bearing means and having ball and shallow socket thrust means with said spindle, a cap secured on said threaded sleeve, a spring within said cap and engaging said blank expeller rod to bias it toward the cutting end of said saw, and a shoulder on said rod engaging the back of said cap to limit the extension of said expeller rod from said saw.

3. A button cutting machine of the horizontal axis type comprising a pair of bearings, a tubular spindle through said bearings, a tubular saw carried by one end of said spindle, one end of one of said bearings having a ball and shallow socket thrust connection with the other end of said spindle, the ball and socket surfaces being generated from a center point located at the center of rotation of said spindle, a blank expeller rod through said spindle, and a spring biasing said expeller rod toward the saw carried by said spindle.

4. In a button cutting machine, bearing means, a spindle journaled therein, said spindle being tubular, a tubular saw carried in one end of said spindle, a saw bushing within said saw, a blank expeller rod through said sleeve and spindle, a thrust sleeve carried by said bearing means and having a ball and shallow socket thrust means with said spindle, a cap removably secured on said thrust sleeve, a spring and adjusting means therefor within said cap to bias said blank expeller rod toward the cutting end of said saw, said cap having a large enough internal diameter to accommodate a spring and adjusting means of larger diameter than the bore of said spindle.

5. In a button cutting machine, a frame, a tubular spindle journaled therein, a tubular saw carried by one end of said spindle, a sleeve screw threadedly carried by said frame and having a concave seat, a thrust connection with the other end of said spindle including a thrust element having a convex surface against said seat, said sleeve being threaded relative to said frame to take up developed end play, and a blank expeller rod through said spindle and sleeve.

6. In a button cutting machine, bearing means, a spindle rotatable therein, said spindle being tubular, a tubular saw carried in one end of said spindle, a sleeve within said saw to support it, a blank expeller rod through said sleeve and spindle, a threaded sleeve carried by said bearing means and having a thrust bearing connection with said spindle, a cap slidable on said sleeve, means for clamping said cap thereto, a spring within said cap to bias said expeller rod toward the cutting end of said saw, a shoulder on said rod engaging the back of said cap to limit the extension of said expeller rod from said saw, and adjusting means on said rod within said cap for the tension of said spring.

7. In a machine of the character disclosed, a tubular spindle, means for journaling said spindle, a tubular saw carried by one end of said spindle, a ball and shallow socket thrust means between said means and said spindle at the other end thereof, a blank expelling rod through said spindle and held against rotation therewith, spring means located externally of said spindle and biasing said expelling rod toward extension from the cutting end of said saw, and means adjustable externally of said spindle for changing the tension of said spring means.

8. In a button blank cutting machine of the character disclosed, a tubular spindle, bearing means therefor, a split tubular saw at one end of said spindle, a saw bushing within said tubular saw, a blank expeller rod through said saw bushing, a spindle and bearing means, ball and shallow socket thrust means at the other end of said spindle and including a sleeve threaded relative to said bearing means for adjusting said ball and shallow socket thrust means, a cap adjustably threaded on said threaded sleeve, a spring within said cap having its ends engaging the cap and a shoulder on said expeller rod respectively to propel said expeller rod to a position extending from the cutting end of said saw, a shoulder on the expeller rod outside said cap to limit extension of said expeller rod from said saw, and means carried by said cap to prevent rotation of said expeller rod with said saw.

9. In a button cutting machine, a tubular spindle, bearing means for journaling said spindle, a tubular saw carried by one end of said spindle, a thrust connection between said bearing means and said spindle at the other end of said spindle, and a blank expeller rod through said spindle, said thrust connection surrounding said expeller rod and including a concave seat and a convex shoulder interfitting therewith and generated as a portion of a sphere having its center lying in the axis of rotation of said spindle.

10. In a button blank cutting machine, a tubular spindle, a tubular saw at one end thereof, a saw bushing within said tubular saw, a blank expeller rod through said saw bushing and spindle, ball and shallow socket thrust means at the other end of said spindle and including a threaded sleeve, a cap adjustably threaded on said threaded sleeve, and a spring within said cap having its ends engaging the cap and a shoulder for said expeller rod respectively to propel said expeller rod to a position extending from the cutting end of said saw, the adjustment of said cap changing the tension of said spring, said ball and shallow socket thrust means being arranged to surround said expeller rod.

11. In a machine of the character disclosed, a tubular spindle, bearings therefor, a tubular saw carried thereby, ball and shallow socket thrust means for said spindle, a blank expeller rod through said spindle and held against rotation therewith, said thrust means being annular and surrounding said expeller rod, spring means biasing said expeller rod toward extension from the cutting end of said saw, and a cap carried by one of said bearings, said cap enclosing said spring and being adjustable relative to said bearing for changing the tension of said spring.

12. In a button blank cutting machine of the character disclosed, a tubular spindle, a tubular saw at one end of said spindle, a saw bushing within said tubular saw, a blank expeller rod through said saw bushing and spindle, ball and shallow socket thrust means at the other end of said spindle and including a sleeve, a cap adjustably threaded on said sleeve, a spring within said cap having its ends engaging the cap and said expeller rod respectively to propel said expeller rod to a position extending from the cutting end of said saw, and a shoulder on the expeller rod outside the cap to limit extension of said expeller rod from said saw.

13. In a button blank cutting machine of the character disclosed, a tubular spindle, bearing means therefor, a tubular saw at one end of said spindle, a saw bushing within said tubular saw, a blank expeller rod through said saw bushing, spindle and bearing means, ball and shallow socket thrust means at the other end of said expeller and including a sleeve threaded in said bearing means for adjusting said ball and socket means for end play, a cap on said threaded sleeve, a spring within said cap having its ends engaging the cap and a shoulder for said expeller rod respectively to propel said expeller rod to a position extending from the cutting end of said saw, a shoulder on the expeller rod outside the cap to limit extension of said expeller rod from said saw, and means to prevent rotation of said expeller rod with said spindle.

14. In a button blank cutting machine of the character disclosed, a tubular spindle, bearing means therefor, a tubular saw at one end of said spindle, a saw bushing within said tubular saw, a blank expeller rod through said saw bushing, spindle and bearing means, thrust means at the other end of said expeller and including a sleeve secured to said bearing means, a cap on said sleeve, a spring within said cap having its ends engaging the cap and a shoulder for said expeller rod respectively to propel said expeller rod to a position extending from the cutting end of said saw, a shoulder on the expeller rod outside said cap to limit extension of said expeller rod from said saw, said cap being removable from said sleeve and said expeller rod being removable therewith.

15. In a button cutting machine, a pair of bearings, a tubular spindle through said bearings, a tubular saw carried by one end of said spindle, a threaded sleeve carried by one of said bearings and having a concave seat and convex shoulder connection with the other end of said spindle, a blank expeller rod through said spindle and sleeve, and a spring biasing said expeller rod toward the cutting end of said spindle, said expeller rod being retractible to permit removal of said tubular saw laterally from said spindle after it is withdrawn therefrom without interference by the expeller rod.

16. A button cutting machine of the horizontal axis type comprising a pair of bearings, a spindle through said bearings, a tubular saw carried by one end of said spindle, a blank expeller rod through said spindle, a spring biasing said expeller rod toward the saw carried by said spindle, a cap carried by one of said bearings and enclosing said spring, said expeller rod having an adjustable shoulder outside said cap and a second adjustable shoulder inside said cap with said spring located between said second shoulder and a portion of said cap through said expeller rod slidably extends, said cap, expeller rod, spring and shoulders being retractible as a unit to permit removal of said tubular saw laterally from said spindle after it is withdrawn therefrom without interference by the expeller rod.

17. In a button blank cutting machine of the character disclosed, a tubular spindle, bearing means therefor, a tubular saw at one end of said spindle, a saw bushing within said tubular saw, a blank expeller rod through said saw bushing, spindle and bearing means, a sleeve in said bearing means, a cap on said sleeve, a spring within said cap having its ends engaging the cap and a shoulder for said expeller rod respectively to propel said expeller rod to a position extending from the cutting end of said saw, a shoulder on the expeller rod outside the cap to limit extension of said expeller rod from said saw, said cap being movable on said sleeve to retract said expeller rod and thereby permit removal of said tubular saw laterally from said spindle after it is withdrawn therefrom without interference by the expeller rod.

RUFUS N. PALMER.

REFERENCES CITED

The following references are of record in the file of this patent:

UNITED STATES PATENTS

| Number | Name | Date |
|---|---|---|
| 919,914 | Miller | Apr. 27, 1909 |
| 1,150,279 | Little | Aug. 17, 1915 |
| 1,442,794 | Chalmers | Jan. 23, 1923 |
| 2,163,338 | Hopkins | June 20, 1939 |

FOREIGN PATENTS

| Number | Country | Date |
|---|---|---|
| 19,329 | France | Sept. 2, 1914 |